United States Patent [19]

Kitchen

[11] 4,091,053
[45] May 23, 1978

[54] COUPLED RESINOUS DIENE COPOLYMER WITH GOOD INTEGRAL HINGE FLEX LIFE AND HIGH HARDNESS

[75] Inventor: Alonzo G. Kitchen, Bartlesville, Okla.

[73] Assignee: Phillips Petroleum Company, Bartlesville, Okla.

[21] Appl. No.: 699,731

[22] Filed: Jun. 24, 1976

[51] Int. Cl.² .................................................. C08F 297/04
[52] U.S. Cl. .................................................. 260/880 B
[58] Field of Search ...................................... 260/880 B

[56] References Cited

U.S. PATENT DOCUMENTS 3,639,517  2/1972  Kitchen .................................. 260/879

*Primary Examiner*—Paul R. Michl

[57] ABSTRACT

A conjugated diene/monovinyl-substituted aromatic compound resinous copolymer such as a styrene/butadiene block copolymer is produced using two additions of the monovinyl-substituted aromatic component and initiator in a manner such that the product has 71 to 81 wt. percent monovinyl-substituted aromatic component and has a ratio based on the number average molecular weight of monovinyl-substituted aromatic component blocks in first and second polymer chains thus produced prior to coupling within the range of 3 to 7. The final product resulting from coupling such polymers has long integral hinge flex life and high hardness. This is accomplished by using no more than 5 millimoles of initiator per mole of monomer in the second addition.

15 Claims, No Drawings

COUPLED RESINOUS DIENE COPOLYMER WITH GOOD INTEGRAL HINGE FLEX LIFE AND HIGH HARDNESS

BACKGROUND OF THE INVENTION

This relates to resinous coupled block copolymers.

It is known to produce block copolymers by the sequential addition of monomers such as styrene and butadiene. It is further known to produce a completely different class of these block copolymers wherein the monovinyl-substituted aromatic compound and initiator are added in two or more increments prior to addition of the conjugated diene and the resulting diblock chains having varying styrene block links are thereafter coupled with a polyfunctional coupling agent.

As is generally the case, the properties of the resulting polymers can be varied by varying the polymerization technique. For instance, if a more flexible material is desired, a smaller amount of monovinyl-substituted aromatic component and a larger amount of conjugated diene can be utilized, but this of course results in sacrificing other properties such as hardness.

SUMMARY OF THE INVENTION

It is an object of this invention to produce a coupled copolymer having both high flex life and good hardness.

In accordance with this invention, a resinous monovinyl-substituted aromatic compound/conjugated diene copolymer is produced using multiple addition of monovinyl-substituted aromatic compound and initiator to give a product having 71 to 81 weight percent monovinyl-substituted aromatic compound with a ratio based on the calculated number average molecular weight of monovinyl-substituted aromatic compound block in the chains produced by the first and second addition of initiator and monovinyl-substituted aromatic compound within the range of 3 to 7.

DESCRIPTION OF THE PREFERRED EMBODIMENTS

The production of resinous branched block copolymers is broadly disclosed in Kitchen et al. U.S. Pat. No. 3,639,517 issued Feb. 1, 1972, the disclosure of which is hereby incorporated by reference. The instant invention represents an improvement over the basic disclosure of Kitchen et al in the provision for a ratio of number average molecular weight of the monovinyl-substituted aromatic compound blocks in the polymer produced by the first and second initiator additions within the range of 3 to 7 as will be described in detail hereinbelow.

The applicable monovinyl-substituted aromatic component monomers, conjugated diene monomers, and initiators are identical to those disclosed in said Kitchen et al patent as is the polymerization procedure, except as specifically noted hereinbelow.

Briefly, polymerization involves the first addition of a monovinyl-substituted aromatic component monomer such as styrene along with an organolithium initiator to produce a group of monovinyl-substituted aromatic component polymer blocks terminated with lithium atoms followed by the introduction of additional initiator and additional monovinyl-substituted aromatic compound monomer so as to produce a second group of monovinyl-substituted aromatic component polymer blocks also terminated with lithium atoms. Thereafter, the conjugated diene monomer is introduced to form chains consisting of monovinyl-substituted aromatic component-diene blocks terminated with lithium atoms having varying lengths because of the multiple addition of the monovinyl-substituted aromatic compound monomer and initiator. Thereafter, a polyfunctional coupling agent having at least 3 functional groups per molecule is employed to join together a plurality of these chains so as to form polymer molecule having terminal polymerized monovinyl-substituted aromatic component blocks.

Providing the necessary favorable polymerized monovinyl-substituted aromatic compound block sequences to achieve substantially greater hinge flex life while retaining good physical properties and Shore D hardness values of about 73 or greater forms the basis of this invention.

Substantially greater hinge flex life in the context of this invention means total cycles ranging from about 650 to about 1,000 or greater for polymers having a 71 to 77 weight percent monovinyl-substituted aromatic compound content and 200 to 650 for those having a 78 to 81 weight percent monovinyl-substituted aromatic compound content. Articles having integral hinges molded from branched block copolymers of the same monovinyl-substituted aromatic compound content but which are not within the specific ratios of monovinyl-substituted aromatic content block length in the two groups of blocks (conventional branched block copolymers) exhibit much lower flex life. The thickness of the hinges of the test samples used establish the above values was about 0.020 inches (0.05 cm) in all instances. Samples having differing hinge thicknesses would be expected to show somewhat different results. However, the relative improvement for the invention polymers compared with conventional polymers is expected to be about the same regardless of the hinge thickness.

Conventional branched block copolymers containing about 76 wt. % polymerized styrene for instance have a Shore D hardness of about 69 whereas invention polymers containing the same wt. % polymerized styrene have Shore D hardness values of about 73 to 75 as well as improved integral hinge flex life. It is desirable that the molded articles have as high a hardness value as possible to reduce marring or scratching which can be incurred during use.

Regulation of the molecular weight of the polymerized monovinyl-substituted aromatic compound blocks in the radial polymers of this invention is achieved by the amount of initiator employed during polymerization. Good results are obtained when using two portions of styrene by using styrene weight ratios, portion one to portion two, ranging from about 1:1.5 to 2:1 preferably 1:1 to about 1.9:1. Good results are obtained with weight ratios of portion one to portion two of initiator ranging from about 0.5:1 to about 1.5:1, preferably 0.67:1 to 1:1.

The polymers of this invention are further characterized as follows: The styrene content in the relatively high molecular weight diblock polymer chains produced by the first addition of monomer and initiator and conjugated diene addition is calculated to be less than 90 weight percent, preferably 80 to 89, more preferably 84 to 85 weight percent. The polymerized styrene content in the relatively low molecular weight diblock polymer chains produced as a result of the second addition of monomer and initiator and conjugated diene addition is greater than 46 weight percent, preferably 47 to 70, more preferably 49 to 67 weight percent.

The ratio of the calculated number average molecular weight of the styrene block in the high and low molecular weight portions (portions resulting from the first and second initiator and styrene additions, respectively) is 3 to 7, preferably 3.5 to 4.8. The ratio of the calculated number average molecular weight of the total monovinyl-substituted aromatic compound-diene block of the high and low molecular weight portions respectively, is less than 4.5, preferably 2 to 4, more preferably 2.5 to 3.3.

The copolymers have a total weight percent monovinyl-substituted aromatic compound content within the range of 71 to 81, more preferably 75 to 77, most preferably about 76 weight percent.

These combinations of properties are achieved by utilizing a content of initiator in the first addition within the range of 2.0 to 2.7, preferably 2.14 to 2.57 millimoles per mole of monomer in that addition and an amount of initiator in the second addition within the range of 3 to 5, preferably 3.66 to 4.93 millimoles of initiator per mole of monovinyl-substituted aromatic compound monomer in that addition.

EXAMPLE

The control resins were prepared as broadly described in the previously mentioned Kitchen et al patent. The invention runs were prepared using relatively more initiator in the first addition and relatively less in the second.

The polymers were prepared in a 5 gallon (0.019 m$^3$) stirred reactor according to the following general charge order:

Cyclohexane containing 0.025 parts by weight per 100 parts by weight monomer (PHM) tetrahydrofuran (THF).
   Styrene, first portion.
   n-Butyllithium solution, first portion, about 10 wt. % in cyclohexane.
   n-Butyllithium solution, second portion.
   Styrene, second portion
   Conjugated diene.
   Epoxidized soybean oil solution (0.50 g oil/cc cyclohexane).
   Water, 0.2 PHM.
   CO$_2$, 0.1 PHM.
   Antioxidant in cyclohexane solution.

About 93 weight percent of the total cyclohexane containing 0.025 parts by weight THF per 100 parts by weight monomer (PHM), was preheated to about 100° F (38° C) and charged to the reactor. The remaining cyclohexane was consumed as a diluent or flush for the portions of monomers subsequently added to the reactor. It is essential to have two separate charges of styrene and initiator. The exact mode of adding each of these two charges of styrene can vary, however. The simplest procedure is simply to add all of the first charge at one time and all of the second at one time. Alternatively one or both can be added continuously or incrementally. The advantage of incremental addition, particularly of the charge associated with the second initiator addition is to limit the peak temperature resulting from each addition to below about 180° F (82° C) which has been found to be desirable in this process. The procedure actually used in this example is as follows. After charging the cyclohexane, the first portion of styrene was charged and then the first portion of n-butyllithium initiator. Then the second portion of initiator was charged and the second portion of the styrene monomer. The first styrene portion and the second styrene portion were allowed to polymerize about 10–20 minutes. The peak temperatures reached during styrene polymerization ranged from about 160° to about 175° F (71°–79° C) for the various runs. The conjugated diene, preferably 1,3-butadiene, or conjugated dienes, if more than one was used (the second being isoprene) was then charged. Each diene was charged separately in one increment. Total polymerization time for diene(s) amounted from about 20–40 minutes and the peak temperatures reached averaged about 214° F (101° C). Following polymerization of the diene charge, while the polymer cement remained at about 214° F, a solution of epoxidized soybean oil amounting to 0.5 PHM was added. A time of about 20 minutes was allowed for the coupling reaction to take place. The solids content in the reactor at this time averaged about 30–35%. The epoxidized soybean oil had a molecular weight of about 1,000 and contained about 4 epoxy groups per formula weight. Following the coupling reaction, the polymer solution was contacted with about 0.2 PHM water and about 0.1 PHM CO$_2$ for about 10 minutes while still at coupling temperature. Thereafter, the antioxidant solution was added to the reactor and mixed with the contents. The resin was recovered by heating the contents to about 315°–330° F (157°–166° C) and flashing off the solvent.

A stabilizer system consisting of either about 1.5 PHM tris(nonylphenyl) phosphite and about 0.5 PHM 2,6-di-t-butyl-4-methylphenol (BHT) or about 0.5 PHM BHT and about 1.5 PHM Geltrol was used to impart stability to the polymers. Geltrol is a glycine having the formula

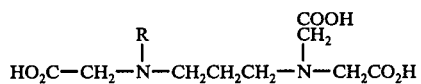

wherein R is either a C$_{14}$, C$_{16}$, or C$_{18}$ alkyl group. An example is: N-octadecyl-N-'-(carboxymethyl)-trimethylene diglycine. These compounds are disclosed in 121.2566 *Federal Register*, Dec. 20, 1969, 34 F.R. 19972, subpart F — Food Additives — pages 62 and 62.1, respectively. While 1.5 PHM was used in the Examples in conjunction with about 0.5 PHM BHT, it is also possible to use this stabilizer in conjunction with both a sterically hindered phenol and an organic phosphite. In such instances, the glycine will be present in an amount within the range of 1 to 50, preferably 25 to 37 weight percent based on the weight of the phosphite. The total amount of phosphite and glycine in the polymer will be within the range of 0.2 to 5, preferably 0.5 to 2 weight percent of this mixture based on the weight of the polymer. The phenol will be present in an amount within the range of 0.05 to 5, preferably 0.1 to 1 weight percent based on the weight of the polymer.

A listing of the quantities of initiators and monomers used, the block sequence for each resin, calculated number average molecular weights and calculated ratios for the high molecular weight blocks to low molecular weight blocks are presented in Table I. The molecular weights are calculated assuming a zero poison level, for convenience.

Selected physical properties for the polymers of Table I are presented in Table IA. The polymers of Table IA, identified by each run number, correspond to those of Table I with the same numerical run number.

Test specimens for determination of integral hinge life were prepared by injection molding at a melt temperature of about 425° F (218° C) and an injection pressure of about 6,000 to about 8,000 psi (41.4 - 55 MPa). Each specimen was about 3.5 inches long (8.9 cm), 1 inch wide (2.5 cm) and 0.08 inches thick (0.2 cm). A V-shaped depression, rounded at the top and bottom, extending across the entire width of the specimen was located about 0.4 inches (1 cm) from one end. The top width of the depression was about 0.16 inches (0.4 cm) and it was about 0.06 inches (0.15 cm) deep. Thus, the minimum thickness of the web forming the hinge was about 0.02 inches (0.05 cm). Each specimen was clamped flush with the hinge and evaluated for flex life by flexing the hinge 180° with a stress of 1.5 kg in a Tinius Olsen Folding Endurance Tester at the rate of about one cycle per second until the hinge failed. The hinge life shown in Table IA represents the average of 10 specimens tested per polymer sample.

Table I

| Run No. | Polymerization Details and Calculated Properties | | | | | |
|---|---|---|---|---|---|---|
| | 1 | 2 | 3[1] | 4 | 5 | 6 |
| Styrene, PHM 1st addition | 56 | 40 | 58 | 57 | 53 | 38 |
| Styrene, PHM 2nd addition | 24 | 40 | 20 | 19 | 23 | 38 |
| NBL, 1st addition[2] | 0.872 | 2.44 | 1.06 | 0.942 | 1.01 | 2.55 |
| NBL, 2nd addition[2] | 7.45 | 3.66 | 9.79 | 9.84 | 8.51 | 3.86 |
| Diene, PHM | | | | | | |
| Butadiene | 20 | 20 | 22 | 24 | 24 | 24 |
| Isoprene | 0 | 0 | 0 | 0 | 0 | 0 |
| Block Sequence | | | | | | |
| Before Coupling | S-B | S-B | S-B | S-B | S-B | S-B |
| Calculated Molecular Weight | | | | | | |
| Polystyrene | | | | | | |
| from 1st addition | 131,910 | 64,350 | 104,730 | 117,770 | 103,400 | 67,100 |
| from 2nd addition | 10,900 | 18,170 | 8,060 | 8,200 | 9,420 | 17,550 |
| HMW[3] S-D Block | 140,000 | 73,420 | 113,600 | 128,080 | 113,300 | 77,780 |
| LMW[4] S-D Block | 20,000 | 27,270 | 16,940 | 18,560 | 19,250 | 28,620 |
| S/D Ratio | | | | | | |
| HMW Portion | 94/6 | 88/12 | 92/8 | 92/8 | 91/9 | 86/14 |
| LMW Portion | 54/46 | 67/33 | 48/52 | 44/56 | 49/51 | 61/39 |
| Block Ratios, High/Low[5] | | | | | | |
| Polystyrene Only | 12.1 | 3.5 | 13.0 | 14.4 | 10.9 | 3.8 |
| S/D | 7.0 | 2.7 | 6.7 | 6.9 | 5.9 | 2.7 |
| Remarks | Control | Invention | Control | Control | Control | Invention |

| Run No. | 7 | 8 | 9 | 10 | 11 |
|---|---|---|---|---|---|
| Styrene, PHM 1st addition | 38 | 45.6 | 53 | 53 | 38 |
| Styrene, PHM 2nd addition | 38 | 30.4 | 23 | 23 | 38 |
| NBL, 1st addition[2] | 2.57 | 2.14 | 2.14 | 0.859 | 2.57 |
| NBL, 2nd addition[2] | 3.86 | 4.83 | 4.93 | 7.78 | 3.86 |
| Diene, PHM | | | | | |
| Butadiene | 24 | 24 | 24 | 19 | 19 |
| Isoprene | 0 | 0 | 0 | 5 | 5 |
| Block Sequence | | | | | |
| Before Coupling | S-B | S-B | S-B | S-I-B | S-I-B |
| Calculated Molecular Weight | | | | | |
| Polystyrene | | | | | |
| from 1st addition | 57,000 | 61,890 | 58,440 | 132,920 | 57,000 |
| from 2nd addition | 16,290 | 13,020 | 10,410 | 10,620 | 16,290 |
| HMW[3] S-D Block | 67,290 | 72,140 | 69,310 | 144,000 | 67,290 |
| LMW[4] S-D Block | 26,570 | 23,300 | 21,280 | 21,690 | 26,570 |
| S/D Ratio | | | | | |
| HMW Portion | 85/15 | 86/14 | 84/16 | 92/8 | 85/15 |
| LMW Portion | 61/39 | 56/44 | 49/51 | 49/51 | 61/39 |
| Block Ratios, High/Low[5] | | | | | |
| Polystyrene Only | 3.5 | 4.8 | 5.6 | 12.5 | 3.5 |
| S/D | 2.5 | 3.1 | 3.3 | 6.6 | 2.5 |
| Remarks | Invention | Invention | Invention | Control | Invention |

[1]Total monomer weight equaled 2500 grams in Runs 3 and 4, 2900 grams in Run 9, all other 30000 g.
[2]Mmoles n-butyllithium per mole styrene in each styrene addition.
[3]Polymerized high molecular weight styrene-diene block.
[4]Polymerized low molecular weight styrene-diene block.
[5]Calculated number average molecular weight.

Table IA

| Run No. | Melt Flow[a] | Hardness Shore D | Flexural Modulus[b] psi × 10⁻³ | | Tensile Yield[c] | | Elongation[c] % | Hinge Flex Life, Cycles | Remarks |
|---|---|---|---|---|---|---|---|---|---|
| | | | psi × 10⁻³ | MPa | psi | MPa | | | |
| 1 | 5.9 | 74 | 275 | 1896 | 4200 | 28.96 | 28 | 123 | Control |
| 2 | 8.8 | 75 | 242 | 1669 | 3880 | 26.75 | 10 | 303 | Invention |
| 3 | 5.5 | 75 | 238 | 1641 | 3280 | 11.31 | 164 | 241 | Control |
| 4 | 5.9 | 69 | 221 | 1524 | 3000 | 20.68 | 167 | 496 | Control |
| 5 | 5.8 | 71 | 230 | 1586 | 3270 | 11.27 | 144 | 508 | Control |
| 6 | 8.0 | 75 | 213 | 1469 | 3330 | 22.96 | 7 | 932 | Invention |
| 7 | 7.2 | 74 | 215 | 1482 | 3570 | 24.61 | 12 | 925 | Invention |
| 8 | 8.2 | 74 | 215 | 1482 | 3600 | 24.82 | 6 | 997 | Invention |
| 9 | 7.6 | 73 | 215 | 1482 | 3730 | 25.72 | 7 | 929 | Invention |
| 10 | 5.2 | 69 | 232 | 1600 | 3110 | 11.03 | 150 | 451 | Control |
| 11 | 8.8 | 74 | 227 | 1565 | 3420 | 23.58 | 11 | 814 | Invention |

[a]ASTM D1238-73, condition G
[b]ASTM D790-71
[c]ASTM D638-72, 0.2 inches/minute Inspection of the data presented in the Tables shows a conventional branched block copolymer in control run 1 containing 80 weight percent polymerized styrene with physical properties typical of such polymers. It possesses a hinge flex life of about 123 cycles and a Shore D hardness of 74. Invention runs 2 shows substantially higher values for flex life as a result of adjusting initiator levels to give a polymer having a ratio of block weights within the scope of this invention. Control runs 3 to 4 show that flex life can be improved by increasing the diene content as might be expected but at a sacrifice in hardness as would also be expected. The polymer of control run 5 represents a conventional branched block copolymer at what the prior art considered optimum conditions. This polymer has better flex life than control 1 but still at a sacrifice in hardness (71 versus 74). The invention polymers of runs 6 to 9 were prepared by either decreasing the first styrene charge and/or increasing the first initiator charge to the reactor. The effect is to reduce the number average molecular weights of the high molecular weight fractions from calculated values of about 120,000 to 150,000 in conventional branched block copolymers down to a value for the invention polymers of about 50 percent of that of the conventional polymers. In addition, the amount of initiator added in the preparation of the low molecular weight fractions is decreased relative to conventional polymerization procedure. The effect is to increase the calculated number average molecular weights of the low molecular weight fractions. Thus, the calculated polystyrene (or polystyrene-polydiene) ratios of the high molecular weight fractions to low molecular weight fractions ranges from 3.5 to 4.8 (2.5 – 3.3) for invention polymers contrasted with the 10.9–14.4 (5.9 – 6.9) for conventional polymers. The figures in brackets represent the calculated values for the corresponding polystyrene-polydiene block ratios. Thus, the low block MW ratios of the invention polymers are associated with high hinge flex life values. Control polymers exhibit high block MW ratios and substantially lower hinge flex life values.

Control 10 and invention run 11 show the same advantage when part of the butadiene is replaced with another diene, isoprene.

The calculation of the number average molecular weight is done based on the amount of initiator and monomer used and employs the assumption that there are no poisons present and that the initiation rate of the second initiator charge is the same as the propagation rate of the first. This is known in the art.

Table II hereinbelow summarizes selected data from Tables I and IA to better illustrate the invention.

increment and more styrene and less initiator in the second so as to give a copolymer which had a polystyrene to polydiene weight ratio in the high molecular weight portions (portions resulting from the addition of the 40 parts of styrene and 0.060 parts of initiator) of 88 to 12. This polymer also had a number average molecular weight ratio of the polystyrene block in the high molecular weight portion (that produced by the first addition) to the low molecular weight portion (that produced by the second addition of styrene and monomer) of 3.5. As can be seen the flex life is better than doubled with the hardness being, if anything, slightly better.

Control run 5 utilizes an optimum weight ratio of styrene to diene (76/24) and what it is believed an optimum weight ratio of styrene addition in the first and second portions for conventional branched block polymers (53/23). As can be seen, this polymer exhibited better flex life than control 1 but at a substantial sacrifice in hardness. Control run 5 is to be compared with invention run 9 at the same amount of polymerized diene level which exhibited greatly increased flex life and increased hardness rather than decreased hardness as would normally be expected to be associated with better flex life. There is no apparent explanation as to why, with the same amount of polymerized diene, flex life can be improved and no deterioration in hardness and indeed, even an improvement in hardness.

It is to be noted that the polymerized styrene to diene weight ratio of the high molecular weight portion of the copolymer comes about as follows. Introduction of the first portion of styrene and initiator after polymerization produces a series of "living" polystyrene chains, each chain having a lithium atom on one end thereof which are relatively high in molecular weight. When the second initiator and styrene is added, new chains are formed each terminated with a lithium atom which do not grow to a length as great as those resulting from the first addition. Thus there is a mixture of long chains resulting from the first addition and short chains resulting from the second. By introduction of the diene, diene is added to the end of each of these chains adjacent to the lithium atom. Thus the column headed S/D Ratio High Molecular Weight Portion refers to the styrene to diene weight ratio in the chains resulting from the polymerization of the diene onto the ends of the polystyrene chains formed from the first addition of monomer. The column labeled "Polystyrene Block Ratio High/Low" simply refers to the ratio of the calculated number aver- Table II

| | Styrene PHM | | NBL, PHM | | Diene, | S/D Ratio HMW | Polystyrene Block Ratio | | Hardness, |
|---|---|---|---|---|---|---|---|---|---|
| | 1st | 2nd | 1st | 2nd | PHM | Portion | High/Low | Flex Life Cycle | Shore D |
| 1 | 56 | 24 | 0.030 | 0.110 | 20 | 94/6 | 20.8 | 123 control | 74 |
| 2 | 40 | 40 | 0.060 | 0.090 | 20 | 88/12 | 3.5 | 303 invention | 75 |
| 5 | 53 | 23 | 0.033 | 0.12 | 24 | 91/9 | 10.9 | 508 control | 71 |
| 9 | 53 | 23 | 0.070 | 0.070 | 24 | 84/16 | 3.6 | 929 invention | 73 |

As can be seen, run 1 representing a conventional branched block copolymer having 56 parts of styrene added in the first increment with 0.030 parts of initiator, 24 parts styrene in the second portion with 0.110 parts of initiator for a total polymerized styrene content of 80 wt percent and a total polymerized butadiene content of 20 wt percent gave a polymer with very poor flex life. Invention run 2 utilized the same total amount of styrene and butadiene, but compared with control run 1 less styrene and more initiator were used in the first age molecular weight of the polystyrene blocks in the high molecular weight portion of chains formed by the first addition of initiator, to the calculated number average molecular weight of the polystyrene blocks in the chains formed by the second addition of initiator. It is to be noted that all of these values relate to the polymer chains prior to coupling to form the final product.

While this invention has been described in detail for purposes of illustration, it is not to be construed as limited thereby but is intended to cover all changes and modifications within the spirit and scope thereof .

I claim:

1. A coupled resinous block copolymer of a monovinyl-substituted aromatic compound and a conjugated diene, said copolymer having 71 to 81 weight percent polymerized monovinyl-substituted aromatic compound, wherein chains forming said copolymer prior to coupling comprise a high molecular weight portion and a low molecular weight portion, a ratio of calculated number average molecular weight of polymerized monovinyl-substituted aromatic compound blocks of said high molecular weight portion to polymerized monovinyl-substituted aromatic compound blocks of said low molecular weight portion being in the range of 3 to 7, said copolymer being produced by adding monovinyl-substituted aromatic compound monomer in first and second portions, a weight ratio of said monovinyl-substituted aromatic compound in said first portion to that in said second portion being within the range of 1:1.5 to 2:1, with 2.0 to 2.7 millimoles of initiator per mole of monomer in said first portion being introduced with said first portion and 3 to 5 millimoles of initiator per mole of monomer in said second portion being introduced with said second portion.

2. A composition according to claim 1 wherein said monovinyl-substituted aromatic compound is styrene and said conjugated diene is 1,4-butadiene, isoprene, or a mixture thereof.

3. A composition according to claim 2 wherein said ratio of calculated number average molecular weight of said polymerized monovinyl-substituted aromatic compound block of said high molecular weight portion to said calculated number average molecular weight of said polymerized monovinyl-substituted aromatic compound block of said low molecular weight portion is within the range of 3.5 to 4.8.

4. A composition according to claim 2 wherein the ratio of the calculated number average molecular weight of said polymerized monovinyl-substituted aromatic compound blocks in said high molecular weight portion plus polymerized diene blocks attached thereto to said polymerized monovinyl-substituted aromatic compound blocks of said low molecular weight portion plus polymerized diene attached thereto is within the range of 2 to 4.

5. A composition according to claim 2 wherein a ratio of said polymerized monovinyl-substituted aromatic compound blocks of said high molecular weight portion plus polymerized diene to said polymerized monovinyl-substituted aromatic compound blocks of said low molecular weight portion plus polymerized diene attached thereto based on number average molecular weight is within the range of 2.5 to 3.3.

6. A composition according to claim 5 wherein said styrene is present in an amount within the range of 75 to 77 weight percent based on the total weight of styrene plus diene.

7. A composition according to claim 6 wherein said styrene is present in an amount of about 76 weight percent.

8. A composition according to claim 7 wherein said composition has a shore D hardness of at least 73 and a flex life of at least 650 cycles.

9. A composition according to claim 2 wherein said copolymer has a styrene content of about 76 percent.

10. A method for preparing a polymer comprising
    (a) introducing a first portion of monovinyl-substituted aromatic compound monomer into a reaction zone;
    (b) introducing a first portion of an initiator into said reaction zone and polymerizing said first portion of said monovinyl-substituted aromatic compound;
    (c) thereafter introducing a second portion of a monovinyl-substituted aromatic compound into said reaction zone, a weight ratio of said monovinyl-substituted aromatic compound in said first portion to monovinyl-substituted aromatic compound in said second portion being within the range of 1:1.5 to 2:1;
    (d) introducing a second portion of said initiator into said reaction zone and polymerizing said second portion of said monovinyl-substituted aromatic compound, said first portion of initiator being introduced in an amount within the range of 2.0 to 2.7 millimoles per mole of said monomer in said first portion, and said second portion of initiator being introduced in an amount within the range of 3 to 5 millimoles per mole of said monomer in said second portion,
    (e) introducing at least one conjugated diene into said reaction zone and polymerizing said at least one conjugated diene; and
    (f) introducing a polyfunctional coupling agent into said reaction zone to form said polymer having a ratio of calculated number average molecular weight of polymerized monovinyl-substituted aromatic compound blocks from polymerizing said first portion of said monovinyl-substituted aromatic compound to that formed by polymerizing said second portion of said monovinyl-substituted aromatic compound within the range of 3 to 7.

11. A method according to claim 10 wherein said monovinyl-substituted aromatic compound is styrene and said conjugated diene is selected from 1,3-butadiene, isoprene, and mixtures thereof.

12. A method according to claim 11 wherein said wt ratio of monovinyl-substituted aromatic compound in said first and second portions is within the range of 1:1 to 1.9:1.

13. A method according to claim 12 wherein said styrene is present in an amount within the range of 75 to 77 weight percent based on the total weight of styrene and conjugated diene and wherein said diene is 1,3-butadiene.

14. A method according to claim 13 wherein said first portion of initiator is introduced in an amount within the range of 2.14 to 2.57 millimoles per mole of monomer and said second portion is introduced in an amount within the range of 3.66 to 4.93 millimoles per mole of monomer.

15. A method according to claim 14 wherein said coupling agent is epoxidized soybean oil containing about 4 epoxy groups per formula weight and said initiator is n-butyllithium.

* * * * *